United States Patent
McAuley et al.

[11] Patent Number: 6,154,125
[45] Date of Patent: Nov. 28, 2000

[54] AUDIBLE PEDESTRIAN TURN SIGNAL ALERT SYSTEM

[75] Inventors: Robert P. McAuley, Long Beach, N.Y.; Robert S. Berkowitz, 1323 Powell Ave., Merrick, N.Y. 11566

[73] Assignee: Robert S. Berkowitz, Merrick, N.Y.

[21] Appl. No.: 09/458,967

[22] Filed: Dec. 1, 1999

[51] Int. Cl.[7] .................................................. B60Q 1/26
[52] U.S. Cl. .................... 340/465; 340/433; 340/463; 340/465; 340/474; 340/475
[58] Field of Search .................. 340/465, 433, 340/463, 475, 901, 944, 474, 468

[56] References Cited

U.S. PATENT DOCUMENTS

| | | | |
|---|---|---|---|
| 3,343,123 | 9/1967 | Troesh | 340/75 |
| 3,587,094 | 6/1971 | Raymond | 340/384 |
| 4,754,256 | 6/1988 | Fluhr et al. | 340/75 |
| 4,903,007 | 2/1990 | Gottlieb | 340/474 |
| 4,924,208 | 5/1990 | Coughlin | 340/474 |
| 4,980,669 | 12/1990 | Knowles | 340/474 |
| 5,293,151 | 3/1994 | Rose | 340/433 |
| 5,398,024 | 3/1995 | Knowles | 340/474 |

*Primary Examiner*—Jeffery A. Hofsass
*Assistant Examiner*—Son M. Tang
*Attorney, Agent, or Firm*—Robert McAuley; Robert Berkowitz

[57] ABSTRACT

A audible pedestrian alert system for use with vehicles having a wide turning radius such as buses and trucks. A device is disposed in the rear wheel well of the vehicle and is operatively connected to a conventional vehicle turn signal circuit including a battery and a turn signal switch operable to selectively connect the battery through a switching device to at least a first turn signal indicator lamp through a first contact point and to at least a second turn signal indicator lamp through a second contact point. The device includes a sound generating device and a timing and signal conditioning circuit operably connected to the turn signal switch for connecting the battery to the sound generating device. Upon activation of the turn signal switch, a pulsed tone is audible for a pre-determined time.

11 Claims, 2 Drawing Sheets

AUDIBLE PEDESTRIAN TURN SIGNAL ALERT SYSTEM

BACKGROUND OF THE INVENTION

1. Field of the Invention

The present invention relates to turn signal indicators for motor vehicles and more particularly pertains to a new audible pedestrian alert system for use with vehicles having a wide turning radius such as buses and trucks.

2. Description of the Prior Art

The use of turn signal indicators for motor vehicles is known in the prior art. More specifically, turn signal indicators for motor vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art turn signal indicators for motor vehicles include U.S. Pat. No. 4,924,208; U.S. Pat. No. 4,754,256; U.S. Pat. No. 4,196,415; and U.S. Pat. No. 5,051,721.

While these devices fulfill their respective, particular objectives and requirements, the aforementioned patents do not disclose a new audible pedestrian alert system. The inventive device is for use with a conventional vehicle turn signal circuit including a battery and a turn signal switch operable to selectively connect the battery through a switching device to at least a first turn signal indicator lamp through a first contact point and to at least a second turn signal indicator lamp through a second contact point. The inventive device includes a sound generating means and an electronic timing and signal conditioning circuit operably connected to the turn signal switch for connecting the battery to the sound generating means upon activation of the turn signal switch.

In these respects, the audible pedestrian alert system according to the present invention substantially departs from the conventional concepts and designs of the prior art, and in so doing provides an apparatus primarily developed for use with vehicles having a wide turning radius such as buses and trucks.

SUMMARY OF THE INVENTION

In view of the foregoing disadvantages inherent in the known types of turn signal indicators for motor vehicles now present in the prior art, the present invention provides a new audible pedestrian alert system construction wherein the same can be utilized for use with vehicles having a wide turning radius such as buses and trucks.

The general purpose of the present invention, which will be described subsequently in greater detail, is to provide a new audible pedestrian alert system apparatus and method which has many of the advantages of the turn signal indicators for motor vehicles mentioned heretofore and many novel features that result in a new audible pedestrian alert system which is not anticipated, rendered obvious, suggested, or even implied by any of the prior art turn signal indicators for motor vehicles, either alone or in any combination thereof.

To attain this, the present invention generally comprises a sound generating means and an electronic timing and signal conditioning circuit operably connected to the turn signal switch for connecting the battery to the sound generating means upon activation of the turn signal switch.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new audible pedestrian alert system apparatus and method which has many of the advantages of the turn signal indicators for motor vehicles mentioned heretofore and many novel features that result in a new audible pedestrian alert system which is not anticipated, rendered obvious, suggested, or even implied by any of the prior art turn signal indicators for motor vehicles, either alone or in any combination thereof.

It is another object of the present invention to provide a new audible pedestrian alert system which may be easily and efficiently manufactured and marketed.

It is a further object of the present invention to provide a new audible pedestrian alert system which is of a durable and reliable construction.

An even further object of the present invention is to provide a new audible pedestrian alert system which is susceptible of a low cost of manufacture with regard to both materials and labor, and which accordingly is then susceptible of low prices of sale to the consuming public, thereby making such audible pedestrian alert system economically available to the buying public.

Still yet another object of the present invention is to provide a new audible pedestrian alert system which provides in the apparatuses and methods of the prior art some of the advantages thereof, while simultaneously overcoming some of the disadvantages normally associated therewith.

Still another object of the present invention is to provide a new audible pedestrian alert system for use with vehicles having a wide turning radius such as buses and trucks.

Yet another object of the present invention is to provide a new audible pedestrian alert system which includes a sound generating means and an electronic timing and signal conditioning circuit operably connected to the turn signal switch for connecting the battery to the sound generating means upon activation of the turn signal switch.

Still yet another object of the present invention is to provide a new audible pedestrian alert system that increases the safety of school children and their parents by providing them with an audible indication of the impending movement of a school bus.

Even still another object of the present invention is to provide a new audible pedestrian alert system that increases the safety of unsuspecting pedestrians at corners by providing them with an audible indication that a vehicle having a wide turning radius is making a turn.

Still yet another object of the present invention is to provide a new audible pedestrian alert system that alerts blind persons of the turning of a vehicle having a wide turning radius.

Yet another object of the present invention is to provide a new audible turn indicator that is easily connected to an existing turn signal circuit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
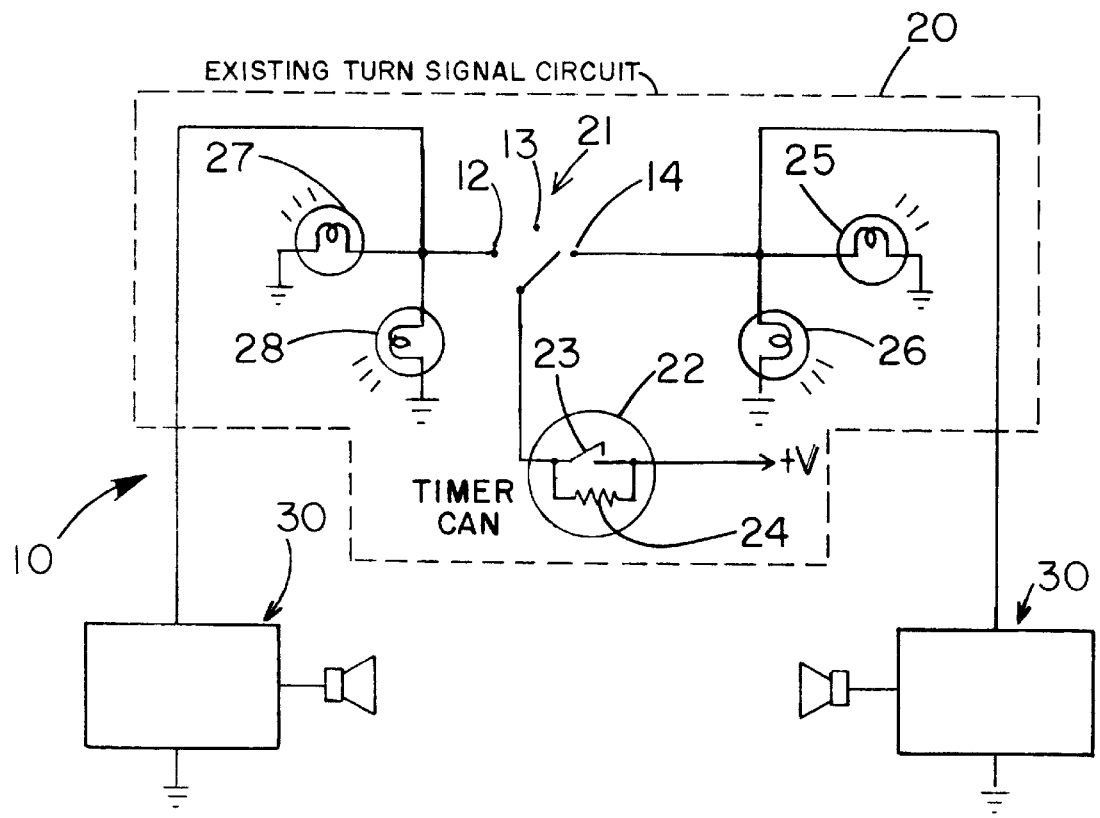
FIG. 1 is a schematic diagram of a new audible pedestrian alert system according to the present invention.
Figure 2:
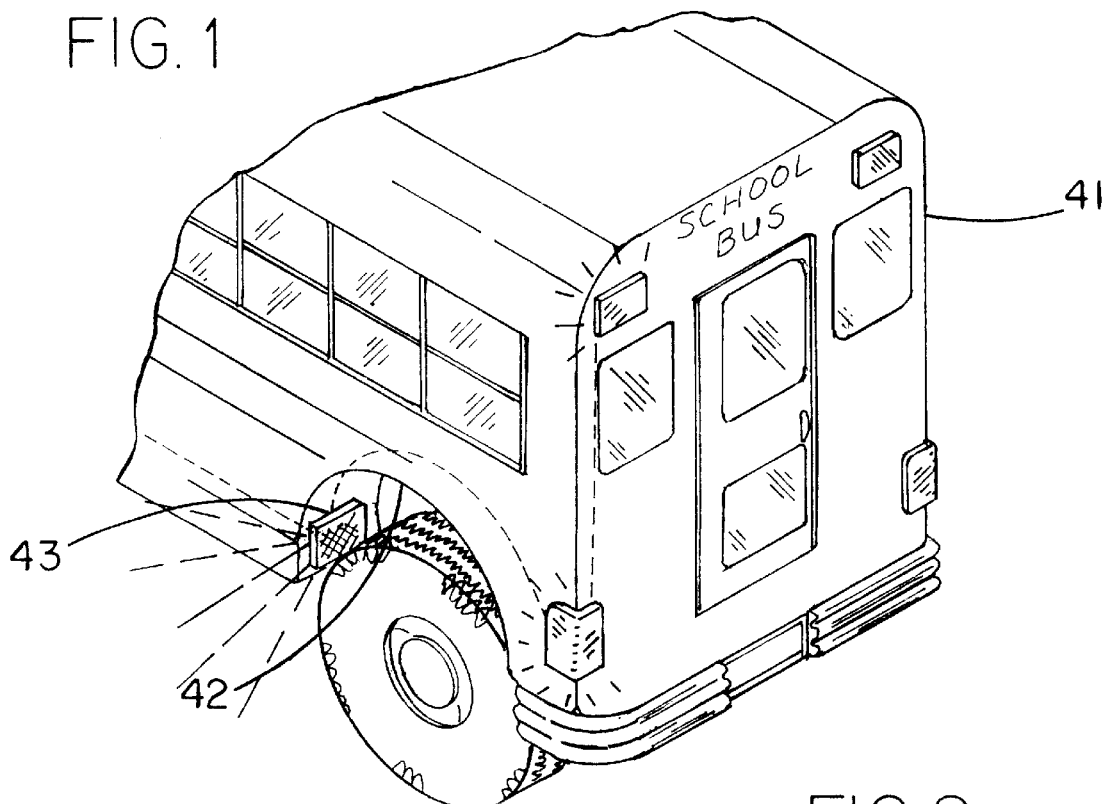
FIG. 2 is a partial top perspective view of a school bus showing the buzzer of the present invention disposed in the wheel well.
Figure 3:
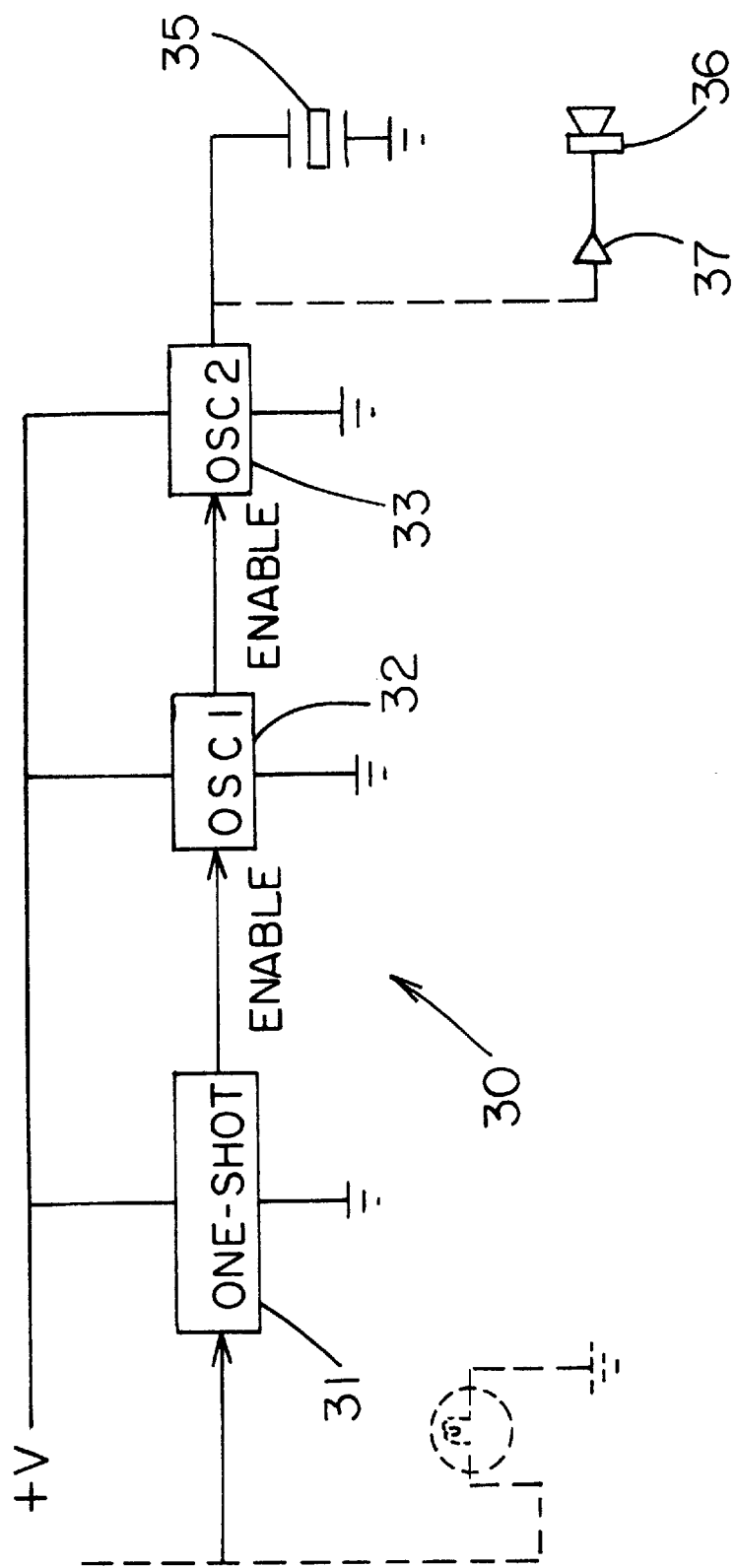
FIG. 3 is a schematic diagram of the timing and signal conditioning circuit of the present invention.

With reference now to the drawings, and in particular to FIGS. 1 through 3 thereof, a new audible pedestrian alert system embodying the principles and concepts of the present invention and generally designated by the reference numeral 10 will be described.

More specifically, it will be noted that the audible pedestrian alert system 10 comprises a sound generating means such as a piezoelectric sound generating device 35 and a timing and signal conditioning circuit, generally designated 30, operably connected to a turn signal switch 21 for connecting the battery to the sound generating means.

With reference to FIG. 1 there is shown an existing vehicle turn signal circuit including a battery, designated as +V, and a turn signal switch 21 which is preferably a single pole, triple throw switch. The turn signal switch 21 selectively connects the battery +V through a switching device 22 to a first set of turn signal indicator lamps 27 and 28 for indicating a left turn at first contact point 12. Similarly, the turn signal switch 21 selectively connects the battery +V through the switching device 22 to a second set of turn signal indicator lamps 25 and 26 for indicating a right turn at second contact point 14. A third position 13 is provided in which the battery +V is not connected to either the first set of turn signal indicator lamps or to the second set of turn signal indicator lamps.

The switching device 22 is of the type well known in the art including a bimetallic element 23 which closes a pair of contact points upon being heated by a resistive heating element 24. With the contact points closed, current flows to the selected turn signal indicator lamps and the resistive heating element 24 is shorted causing it to cool. In turn the bimetallic element 23 cools opening the contact points and the cycle is repeated until the turn signal switch 21 disconnects the battery +V from the switching device 22. In this manner the turn signal indicator lamps are made to flash so as to indicate the intention to turn of the operator of the vehicle.

In accordance with the invention, a pair of timing and signal conditioning circuits 30 are operatively coupled to the turn signal switch 21, a first such circuit being coupled to contact point 12 and a second such circuit being coupled to contact point 14. In this manner the first circuit is energized upon connection of the battery +V to contact point 12 and the second circuit is energized upon connection of the battery +V to contact point 14.

With reference to FIG. 3, the timing and signal conditioning circuit 30 includes a pulse stretching means such as a CM3905 timer configured as a one-shot multivibrator 31. The one-shot multivibrator 31 is a timing element for setting the length of time a sound generating means such as piezo element 35 is energized by the timing and signal conditioning circuit 30.

A pair of oscillators 32 and 33 are operatively coupled to the one shot multivibrator 31. Oscillator 32 is configured for pulsed operation, preferably about 10 pulses per second. Oscillator 33 is configured to generate a tone, preferably a 2 kHz tone. The timing and signal conditioning circuit 30 is therefore operable to generate a pulsed tone for a predetermined time, the pulsed tone being generated upon either of the first set or second set of turn indicator lamps. As shown, piezo element 35 is coupled to oscillator 33 but alternatively, a speaker 36 may be employed as the sound generating means through amplifier 37. Upon activation of the turn signal switch 21, a pulsed tone is audible for a predetermined time.

With reference to FIG. 2 there is shown a rear portion of a school bus 41. A housing 43 is shown for containing one of the sound generating means fixedly attached to a rear wheel well 42 in such manner that persons located near the school bus will hear the sound generated by the piezoelectric sound generating device. In similar fashion a second housing (not shown) is fixedly attached to a rear wheel well on a side opposite wheel well 42 for containing one of the sound generating means.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An audible pedestrian turn signal alert system for a vehicle turn signal circuit including a battery and a turn signal switch operable to selectively connect the battery through a switching device to at least a first turn signal indicator lamp through a first contact point and to at least a second turn signal indicator lamp through a second contact point, the audible pedestrian alert system comprising:

a sound generating means located on the exterior of the vehicle; and a timing and signal conditioning circuit means operably connected to the turn signal switch for connecting the battery to the sound generating means which alerts the pedestrian as to which indicator lamp has been selected.

2. The audible pedestrian turn signal alert system of claim 1, wherein the timing and signal conditioning circuit means further comprise a pulse stretching means operatively coupled to the turn signal switch, a first oscillator coupled to the pulse stretching means and to a second oscillator coupled to the sound generating means.

3. The audible pedestrian turn signal alert system of claim 1, wherein the sound generating means further comprise a piezoelectric sound generating device.

4. The audible pedestrian turn signal alert system of claim 1, wherein the sound generating means further comprise a speaker operatively coupled to the timing and signal conditioning circuit means through an amplifier.

5. The audible pedestrian turn signal alert system of claim 1, wherein the timing and signal conditioning means and the sound generating means are disposed in a housing, the housing being adapted for fixed attachment to a vehicle wheel well.

6. The audible pedestrian turn signal alert system of claim 5, wherein the vehicle wheel well is a rear vehicle wheel well.

7. The audible pedestrian turn signal alert system of claim 2 wherein the pulse stretching means further comprises a one-shot multivibrator.

8. The audible turn indicator of claim 2, wherein the first oscillator is adapted to provided a pulsed signal.

9. The audible turn indicator of claim 2, wherein the second oscillator is adapted to generate a tone.

10. The audible turn indicator of claim 9, wherein the tone is a 2 kHz tone.

11. The audible turn indicator of claim 8, wherein the pulsed signal is preferably a 10 pulse per second signal.

* * * * *